May 8, 1951  A. A. HOCHER  2,552,173

POLE LINE BONDING CLAMP

Filed Aug. 1, 1946

INVENTOR
Andrew A. Hocher
BY
Green, McCallister & Miller
ATTORNEYS

Patented May 8, 1951

2,552,173

UNITED STATES PATENT OFFICE 2,552,173

POLE LINE BONDING CLAMP

Andrew A. Hocher, Glenshaw, Pa., assignor to Hubbard & Company, a corporation

Application August 1, 1946, Serial No. 687,733

6 Claims. (Cl. 24—126)

This invention relates to clamps and particularly to guy cable clamps for use with anchor rods.

When I refer to anchor rod or rods in the specification and claims, I also have reference to an anchor nut or similar element which may be employed for guy lines.

In the electrical pole line art it has been customary to guy up poles, etc., by a guy wire supported by anchor rods or anchor eye nuts. A single or multi-strand cable is threaded through the eye and its extending end is looped backwardly towards and is secured to the body of the cable by some suitable means, such as a guy clamp.

It will be apparent that without a suitable locking device associated with the guy rod, itself, the clamp is subjected to considerable stress and strain as the tension upon the cable varies under conditions such as encountered in normal usage. It will also be apparent that a poor electrical bond (ground) with the metal anchor rod or of conductor portions thereof will result if the wire is permitted to slip within or is loosely positioned within the eye of the guy rod. It is thus advisable to at least supplement the guy clamp, in order that a good bond may be maintained between the cable and the guy rod.

And, it has been an object of my invention to provide a new and improved bonding clamp of simple and inexpensive construction that may be employed to lock a guy cable or cables to an anchor rod.

Another object has been to devise a bonding clamp that will prevent a loss of efficient electrical contact between a wire cable and a guy rod.

Another object has been to devise a simple and effective fitting for locking a guy wire or cable loop with respect to an anchor rod, thus preventing slippage of the cable through the eye of the anchor rod.

A further object of my invention has been to devise an improved device for limiting transmission of variable strains and stresses that normally occur in a guy wire or cable due to wind, etc.

A still further object has been to devise a positive cable bonding clamp that may be adjusted to close up spacing between opposite wall portions of an anchor rod eye.

These and many other objects of my invention will appear to those skilled in the art from the claims and the hereinafter illustrated embodiments thereof.

In the drawings: 

Although I have exemplified my invention by the illustrated embodiments, and hereinafter by a somewhat detailed description thereof, it will be apparent to those skilled in the art that various modifications, revisions, additions, and omissions may be effected without departing from the spirit and scope of the invention, as indicated by the appended claims.

Figure 1:
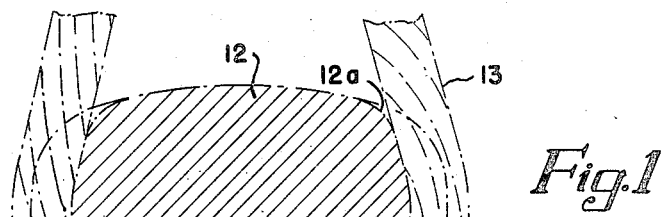
Figure 1 is an enlarged side sectional detail illustrating an embodiment of my invention in a locked or expanded position with respect to a guy cable and an anchor rod.
Figure 2:
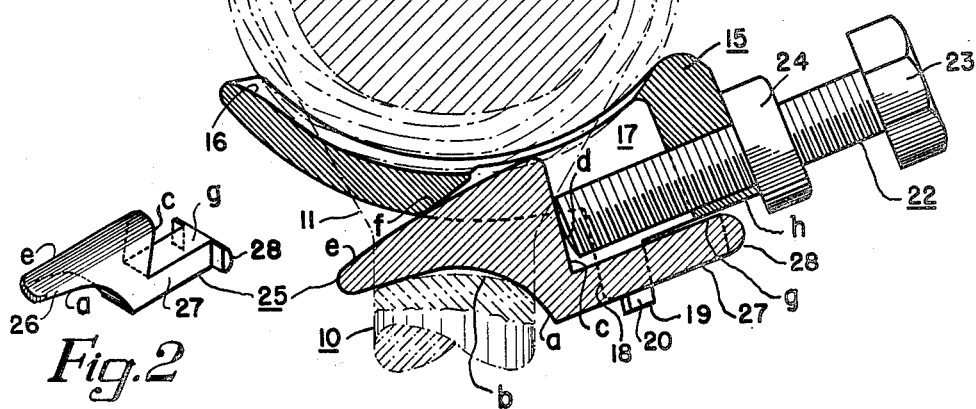
Figure 2 is a front perspective view of a secondary member part or element of the embodiment shown in Figure 1.

As shown, for example, in Figure 1, the illustrated device of my invention comprises two parts which are adapted to be slid into the eye of an anchor rod and into abutment with the cable or cables looped therethrough. Such two parts are operably associated in an interfitting relationship with each other for adjustment by means of a tertiary part or element to tighten the cable and clamp it against one of a pair of opposite wall portions of the eye to thus clamp the cable and prevent it from slipping about its looped portion. The tertiary element can be moved outwardly to permit the other two elements to converge or close up with respect to each other, so that they can be removed or inserted into the eye of the anchor rod.

In Figure 1, I represent an anchor rod or cap 10 as having an eye 11 and a thimble or spool 12 provided with a guy wire slot or guide groove 12a within which an end of the cable 13 may be looped over as it is threaded through the anchor bolt eye. It is customary to loop the end of the cable 13 back upon its main or tension body portion and to clamp or tie such end thereto.

Figures 5, 6:
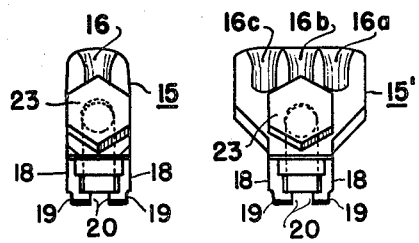
Figure 5 is a back end view in elevation of the device of Figure 3.
Figure 6 is a view similar to Figure 5, but employing the base member part of Figure 4.

The device illustrated in Figures 1, 2, 3, 5, and 7, comprises a base member or housing or primary element or body part 15, a secondary and adjustable member or body part 25, and a tertiary or adjusting member part 22 which cooperates with both of the first-mentioned elements. The base member part 15 is shown provided with a concave face or groove 16 for guidably receiving one side of the cable 13, adjacent the inner wall portion of the thimble 12. The part 15 is also shown with a housing having a slotted out center 17 for adjustably and operatively receiving the secondary element 25. A pair of spaced-apart downwardly extending lug ears 18 of the base part 15 terminate in guide lugs 19 which may, as shown in Figure 5, be slightly turned over and inwardly at their ends 20 to slidably position the secondary part 25.

The tertiary element or threaded bolt or screw 22 is adjustably threaded through a rear end portion of the base member part 15 and is provided with a suitable locking nut 24 which may be of any suitable type, although illustrated as a square nut. A wrench flat 23 or, if desired, a set screw or thumb nut can be employed to move the bolt 22 inwardly and outwardly through a rear end or shoulder of the part 15.

The secondary member part 25 adjustably, and if desired, removably interfits with the base member part 15, and is provided with a front or toe portion 26 having a curvilinear concave guide or wedge lower face $a$ that is curved to mate with and adapted to abut against and adjustably slide along a convex curvilinear face $b$ of one of the opposite wall portions of the anchor rod eye 11. An upper, inclined or wedge face $e$ of the element 25 is adapted to adjustably and slidably engage an inclined wedge face $f$ adjacent the slot 17 in the base member part 15. The part 25 also has a sloped, step-like wedge back or abutment face portion $c$ that is adapted to be adjustably engaged and to slide along a tapered end $d$ of the bolt 22.

The secondary part 25 has a backwardly extending body portion or ledge 27 which is adapted to be slidably positioned and to be free to pivot between the spaced ears 18, the lugs 19, and the ends 20 of the base member part 15. The ledge portion 27 is provided with a transversely extending end stop 28, see Figure 2, that is adapted to cooperate with the back edge of the ears 18 to limit the inward movement of the secondary member 25 with respect to the primary part 15. An upper face $g$ of the ledge portion 27 is adapted to slidably move along a lower face $h$ of the primary or base member part 15 as the secondary member 25 is adjusted by means of the bolt 22.

Figure 7:
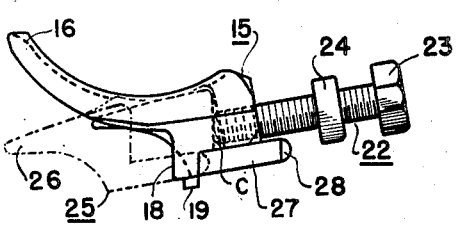
Figure 7 is a side view in elevation of the device illustrated in Figure 1 and utilizing a base member part such as shown in either of Figures 3 or 4; in this figure an initial or unlatched relationship of base and secondary member parts is represented by full lines, and a locked relationship is shown by the dot and dash lines.

Referring particularly to Figure 7, when the secondary part 25 is retracted to the full line position shown, it is substantially complementary with the primary part 15, thus permitting the device to be easily inserted and removed from the eye of the anchor rod 10. As will be appreciated, from the dot and dash lines, the secondary part 25 may be moved to any desired expanded and locking relationship by moving the adjustable or wedging bolt 22 inwardly against the wedge face $c$. The extent of the inward movement is governed by the end stop 28 and by the diameter of the cable 13 which is to be clamped in position. It will be noted that the secondary member 25 has pivot surfaces, namely $e$, $c$, and $g$. The movement of the secondary part 25 is in effect a pivoted-wedge-latching movement to expand the device between opposite wall portions of the eye 11.

Figures 3, 4:
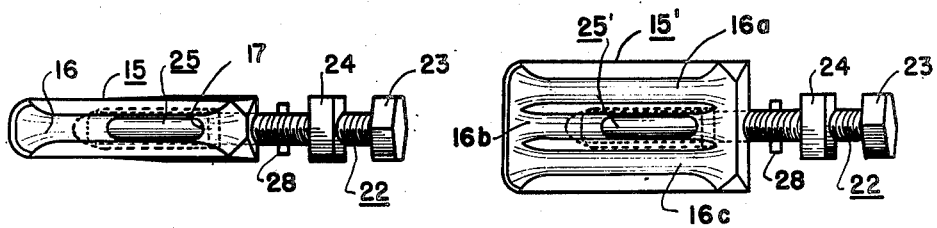
Figure 3 is a top plan view of the embodiment shown in Figure 1, particularly illustrating a single cable or strand base member part or element.
Figure 4 is a view similar to Figure 3, but illustrating a multi-cable or strand base member part.

In Figures 4 and 6, I have shown a modified form of primary or base member part 15' which is provided with multi-cable or strand receiving grooves 16a, 16b, 16c. It will be noted that the construction is the same as the previously discussed embodiment, except that the primary part 15' is widened and grooved to receive more than one cable or strand. Although I have shown the same form of secondary element 25 in the same working arrangement in this embodiment, I also contemplate the employment of a secondary element having multi-front wedge portions 26 fitting within multi-grooves formed in the primary member part 15'. However, I prefer to provide an interchangeable secondary part, see Figure 2, that may be employed regardless of whether a one, two, or three, etc., strand-receiving base part is to be utilized.

The upper end of the front portion 26 of the secondary part 25 may extend beyond the slotted opening 17 in the primary part 15 to directly engage the cable 13 and lock it, see Figure 1, although at the same time it is in engagement with the part 15 and causes the latter to also clamp the cable in position.

The device of my invention may be made of any suitable material, for example, of malleable iron, drop forged steel, a die casting, aluminum, etc. That is, I prefer to employ a device that is electrically conductive, although this is not essential in view of the fact that the guy wire is locked or clamped tightly against conductive wall portions of the anchor rod that is preferably of metal construction.

It will thus appear that the clamp of my invention is adapted to be mounted or positioned to secure or bond a cable 13 within an eye extending through an upright member or anchor rod 10 which eye is defined by a pair of opposed curved wall portions. The primary clamping body part 15 of such clamp has, as shown in Figure 1, a curved clamping face (upper face) that is adapted to receive the cable 13 and that is shaped to mate with the opposed curved wall portion provided by the thimble 12 to hold the cable in position thereon. The secondary clamping body 25 which is adjustably positioned within the slotted portion 17 of the primary body part 15 and which extends therefrom towards the other opposed curved wall portion $b$ defining the eye, has a curved clamping face (bottom face) shaped to mate with and engage the other opposed curved wall portion $b$. It will also be noted that the primary body part 15 has an abutment portion extending perpendicular to or substantially vertically from the curved clamping face of this part and that this portion serves to adjustably position the adjusting stem or part 22. The abutment $c$ of the part 25 which serves as an integral connection between its toe portion 26 and its ledge portion 27, has a (substantially horizontally) spaced and opposed relationship with the abutment portion of the primary part 15 and is engaged by such adjustable stem 22, so that the two parts 15 and 25 may be moved or adjusted into an expanded relationship within the eye of the upright member and thus, securely clamp the cable 13 in position in the manner disclosed in Figure 1.

What I claim is:

1. In a bonding clamp for securing a cable in position within an eye extending through an upright member which eye is defined by a pair of opposed curved wall portions, a primary clamping body adapted to extend through the eye and having a curved clamping face adapted to receive the cable and being shaped to mate with one of the opposed curved wall portions to hold the cable in position thereon, a slotted portion through said primary clamping body open to its said clamping face, an inclined wedge face along said slotted portion, a secondary clamping body adjustably positioned within said slotted portion of said primary body and extending therefrom towards the other opposed curved wall portion, said secondary clamping body having a curved clamping face shaped to mate with and engage the other opposed curved wall portion, and opposed inclined face on said secondary body adapted to engage and slide along said wedge face an abutment portion projecting from said secondary body substantially perpendicular to its said curved clamping face, and a stem adjustably positioned on said primary body and extending therefrom into engagement with said abutment portion to advance said opposed inclined face along said inclined wedge face and move said secondary body outwardly within said primary body against the other opposed curved wall portion.

2. A bonding clamp as defined in claim 1 wherein, said curved clamping face of said primary body has multi-grooves therealong to receive cable strands therein.

3. A bonding clamp as defined in claim 2 wherein, a pair of spaced-apart lug ears project from said slotted portion of said primary body and along said secondary body, and guide lugs project transversely-inwardly from end portions of said lug ears and over said secondary body to retain said secondary body within said primary body.

4. A body clamp as defined in claim 3, wherein, a pair of end stops extend transversely-outwardly from said secondary body and are adapted to engage said pair of lug ears to limit a maximum outward adjustment of said secondary body within said primary body.

5. In a bonding clamp for securing a cable in position within an eye extending through an upright member which eye is defined by a pair of opposed and spaced-apart curved wall portions, a primary clamping body part adapted to extend substantially horizontally through the eye and having a substantially horizontal curved clamping face adapted to receive the cable and mate with one of the opposed curved wall portions to clamp the cable in position thereagainst, a slotted portion extending substantially vertically through said primary body part from its said curved clamping face, a secondary clamping body part having a substantially horizontal curved clamping face shaped to mate with and engage the other of the opposed curved wall portions, a substantially vertically projecting portion on said secondary body part positioned within said slotted portion, a substantially vertically inclined wedge face along the inside of said slotted portion, a substantially vertically inclined face along said projecting portion and in sliding engagement with said inclined wedge face, an abutment portion projecting substantially vertically from said curved clamping face of said primary body part, an opposed substantially vertical abutment carried by said projecting portion of said secondary body part and positioned in a spaced-apart and opposed relationship with respect to said abutment portion, and a stem adjustably carried by said abutment portion of said primary body part and extending substantially horizontally therefrom into engagement with said abutment to move said secondary body part substantially vertically outwardly with respect to said primary body part along said inclined wedge face into clamping engagement with the other opposed curved wall portion.

6. In combination with an upright member having an enlarged thimble portion about which a cable is adapted to extend and which thimble portion has a curved wall portion in an opposed-spaced and eye-defining relationship with a curved wall portion of the upright member, an expansible bonding clamp operatively positioned to extend through the eye and having a primary body part and a secondary body part; said primary body part having a curved clamping face extending through the eye to receive the cable and being shaped to mate with the curved wall portion of the thimble, said primary body part having an abutment portion at one extending end thereof that projects away from said curved clamping face, a slotted portion open to said curved clamping face and extending through said body part to define said abutment portion on one side thereof and defining an inclined wedge face portion on an opposite side thereof; said secondary body part having a toe portion positioned to extend along said slotted portion towards said curved clamping face of said primary body part, said toe portion having an inclined face slidably engaging said inclined wedge face of said slotted portion, said toe portion having a curved clamping face shaped to mate with and engage the opposed curved wall portion of the eye, a ledge portion adapted to extend outwardly from the eye towards said abutment portion and connected to said toe portion by an abutment face in an opposed relation to said abutment portion; said slotted portion of said primary body part having portions extending along said ledge portion of said secondary body part and shaped to hold said secondary body part in an operating relationship with respect to said primary body part, and a stem adjustably mounted in said abutment portion of said primary body part and engaging said abutment face of said secondary body part to move said toe portion of said secondary body part outwardly along its said inclined face with respect to said primary body part to expand said clamp within the eye and securely bond the cable in position on the thimble.

ANDREW A. HOCHER.

REFERENCES CITED

The following references are of record in the file of this patent:

UNITED STATES PATENTS

| Number | Name | Date |
|---|---|---|
| 539,024 | Bell | May 14, 1895 |
| 1,300,794 | Wriedt | Apr. 15, 1919 |
| 2,025,332 | Bullum | Dec. 24, 1935 |
| 2,098,686 | Holm | Nov. 9, 1937 |
| 2,205,474 | Goeller | June 25, 1940 |
| 2,259,932 | Hejduk et al. | Oct. 21, 1941 |
| 2,302,863 | Hubbard | Nov. 24, 1942 |
| 2,340,444 | Wescott | Feb. 1, 1944 |